US009383226B2

(12) United States Patent
Santos et al.

(10) Patent No.: US 9,383,226 B2
(45) Date of Patent: Jul. 5, 2016

(54) METHOD OF DETERMINING POSITION ON A MAGNETIC TRACK OF AN ENCODER

(71) Applicant: The Timken Company, North Canton, OH (US)

(72) Inventors: Alfred J. Santos, Keene, NH (US); Mark E. LaCroix, Winchester, NH (US); Lei Wang, Massillon, OH (US)

(73) Assignee: The Timken Company, North Canton, OH (US)

( * ) Notice: Subject to any disclaimer, the term of this patent is extended or adjusted under 35 U.S.C. 154(b) by 44 days.

(21) Appl. No.: 14/446,547

(22) Filed: Jul. 30, 2014

(65) Prior Publication Data

US 2014/0340077 A1 Nov. 20, 2014

Related U.S. Application Data

(62) Division of application No. 13/259,252, filed as application No. PCT/US2010/029729 on Apr. 2, 2010, now Pat. No. 8,823,365.

(60) Provisional application No. 61/166,946, filed on Apr. 6, 2009.

(51) Int. Cl.
*G01D 5/14* (2006.01)
*G01D 5/245* (2006.01)

(52) U.S. Cl.
CPC .............. *G01D 5/142* (2013.01); *G01D 5/145* (2013.01); *G01D 5/2457* (2013.01)

(58) Field of Classification Search
CPC ....... G01D 5/142; G01D 5/245; G01D 5/145; G01D 5/2457; G01D 5/2241; G01B 7/14; G01R 33/07; G01R 33/098; G11B 5/3903; G11B 2005/3996; G11B 5/3116; G11B 5/3967; G11B 5/332; G11B 5/3912; G11B 5/3109; G11B 5/127; G11B 5/39; G11B 5/49; G11B 5/584; G11B 27/024; G11B 5/1276; G11B 5/3143; G11B 5/31; G06K 7/087; G06K 19/07; G06K 19/0723; G06K 7/065; G06K 7/084; G06K 7/10336; H01L 43/08; H01L 43/12

See application file for complete search history.

(56) References Cited

U.S. PATENT DOCUMENTS 5,019,776 A * 5/1991 Kawamata ............... G01P 3/488
324/207.12
5,568,048 A * 10/1996 Schroeder .............. G01D 5/145
324/207.12

(Continued)

FOREIGN PATENT DOCUMENTS

WO 98/45667 10/1998

OTHER PUBLICATIONS

PCT/EP2010/029729 International Search Report and Written Opinion.

(Continued)

*Primary Examiner* — Vinh Nguyen
(74) *Attorney, Agent, or Firm* — Michael Best & Friedrich LLP

(57) ABSTRACT

A method of determining a position on a magnetic track of an encoder includes providing a group of magnetic pole pairs that forms a portion of the magnetic track, recording a relative position within a first magnetic pole pair in the group using a first magnetic sensor proximate a high-resolution portion of the magnetic track, detecting adjacent pole junctions within the group of magnetic pole pairs with a second magnetic sensor positioned proximate a reference portion of the magnetic track, correlating the adjacent pole junctions with the first magnetic pole pair to determine a relative position of the first magnetic pole pair within the group, and calculating a local absolute position within the group using the relative position within the first magnetic pole pair and the relative position of the first magnetic pole pair within the group.

20 Claims, 5 Drawing Sheets

(56) References Cited

U.S. PATENT DOCUMENTS

| | | | |
|---|---|---|---|
| 5,898,301 A | 4/1999 | La Croix et al. | |
| 6,307,365 B1 | 10/2001 | Santos et al. | |
| 6,515,471 B1 | 2/2003 | Santos | |
| 6,573,710 B1 | 6/2003 | Santos et al. | |
| 6,700,367 B1 | 3/2004 | Santos et al. | |
| 2004/0061460 A1 | 4/2004 | Desbiolles | |
| 2009/0102461 A1* | 4/2009 | Santos | G01D 5/145 324/207.2 |

OTHER PUBLICATIONS

The Timken Company, M15 Modular Magnetic Encoder Brochure, 2 pages, available at least as early as Aug. 2008.

The Timken Company, Multiplying Encoder ASIC Brochure, 2 pages, available at least as early as Aug. 2008.

The Timken Company, Application Note: MSS-7301 Using the MPS160 ASIC, 7 pages, available at least as early as Aug. 2008.

* cited by examiner

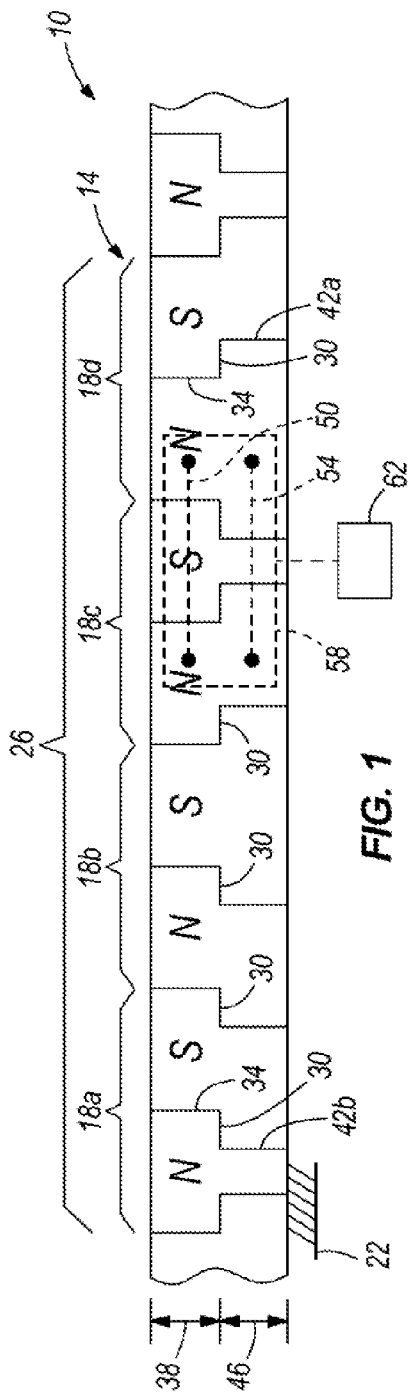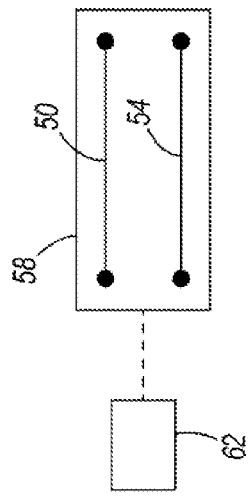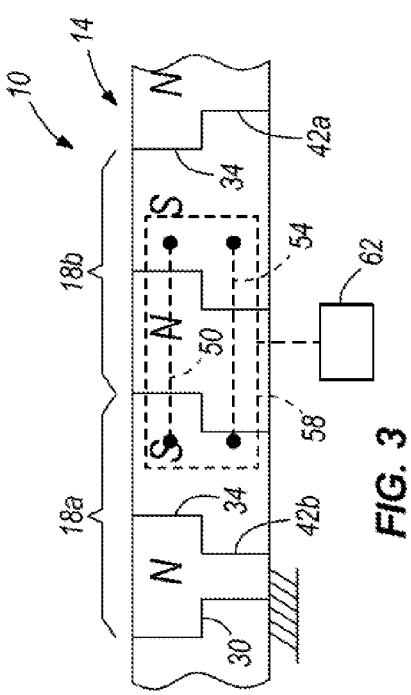

METHOD OF DETERMINING POSITION ON
A MAGNETIC TRACK OF AN ENCODER

CROSS-REFERENCE TO RELATED APPLICATIONS

This application is a divisional of co-pending U.S. patent application Ser. No. 13/259,252 filed on Sep. 23, 2011, now U.S. Pat. No. 8,823,365, which is a national stage entry under 35 U.S.C. §371 of International Patent Application No. PCT/US2010/029729 filed on Apr. 2, 2010, which claims priority to U.S. Provisional Patent Application No. 61/166,946 filed on Apr. 6, 2009, the entire contents of all of which are incorporated herein by reference.

FIELD OF THE INVENTION

The present invention relates generally to sensor assemblies, and more particularly to magnetic encoders including a magnetic track with a plurality of magnetic pole pairs.

BACKGROUND OF THE INVENTION

Magnetic encoders are typically utilized to determine a position of a moving object in a mechanical system so the position or movement of the object can be controlled in the mechanical system. Magnetic encoders typically include a target, including dual multi-pole magnetic tracks, mounted on the moving object and magnetic sensors (e.g., strings of Hall-effect devices) placed in proximity to the poles of the respective magnetic tracks. The pole spacing of the respective magnetic tracks is typically different to induce a phase difference in the signals detected by the magnetic sensors over the respective tracks. The phase difference between the respective signals of the magnetic sensors is then utilized to determine the position of the target, and therefore the movable object, at any given time. In other words, the position of one of the magnetic tracks (i.e., the "measured track") can be determined by comparing the signal output by the magnetic sensor over the measured track and the signal output by the magnetic sensor over the other track (i.e., the "reference track").

SUMMARY OF THE INVENTION

The present invention provides, in one aspect, a method of determining a position on a magnetic track of an encoder. The method includes providing a group of magnetic pole pairs that forms a portion of the magnetic track, recording a relative position within a first magnetic pole pair in the group using a first magnetic sensor proximate a high-resolution portion of the magnetic track, detecting adjacent pole junctions within the group of magnetic pole pairs with a second magnetic sensor positioned proximate a reference portion of the magnetic track, correlating the adjacent pole junctions with the first magnetic pole pair to determine a relative position of the first magnetic pole pair within the group, and calculating a local absolute position within the group using the relative position within the first magnetic pole pair and the relative position of the first magnetic pole pair within the group.

Other features and aspects of the invention will become apparent by consideration of the following detailed description and accompanying drawings.

BRIEF DESCRIPTION OF THE DRAWINGS

FIG. 1 is a schematic view of a first embodiment of a sensor assembly of the present invention, illustrating a magnetic track and two magnetic sensors disposed proximate a first location on the magnetic track.

FIG. 2 is a schematic view of a single microchip incorporating the two magnetic sensors of FIG. 1.

FIG. 3 is a schematic view of the magnetic sensors of FIG. 1 disposed proximate a second location on the magnetic track.

Figure 4:
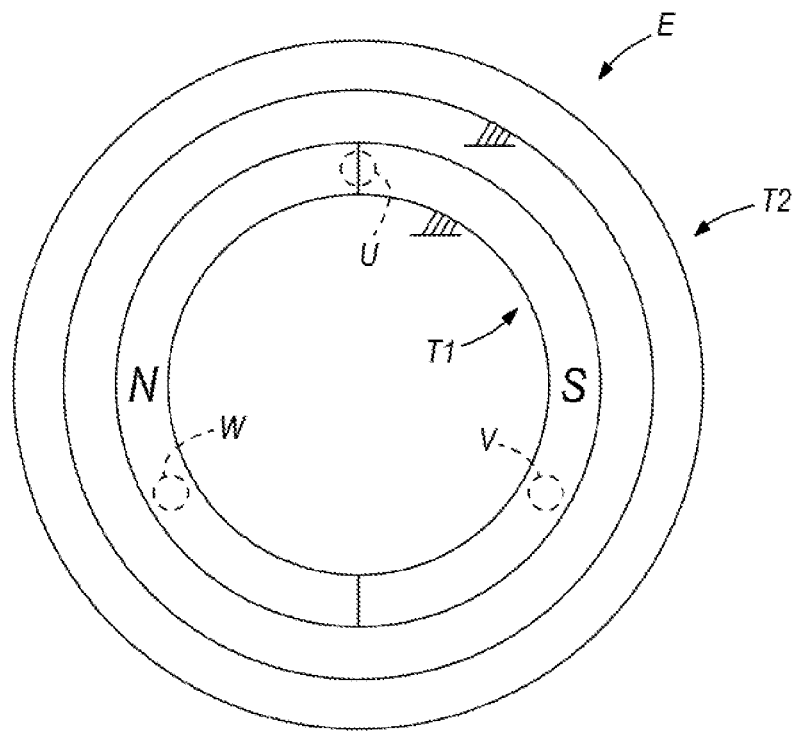
FIG. 4 is a schematic view of a conventional sensor assembly operable to output U, V, W style commutation signals.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

With reference to FIG. 1, a sensor assembly or a magnetic encoder 10 is schematically illustrated. The encoder 10 includes a magnetic track 14 having a plurality of North/South pole pairs 18. Although the magnetic track 14 is schematically illustrated in a linear configuration for clarity, the encoder 10 is configured as a rotary encoder including a rotating target 22 upon which the magnetic track 14 is mounted. In such a configuration, the magnetic track 14 would be circular and concentric with the rotational axis of the rotating target 22. However, the encoder 10 of the present invention may alternatively be configured as a linear encoder, incorporating substantially similar structure and a method of operation as described herein with respect to the rotary encoder 10.

With continued reference to FIG. 1, only a portion of the magnetic track 14 is shown. Specifically, the illustrated portion of the magnetic track 14 includes a group 26 of four pole pairs 18a-18d, each of which includes a pole junction 30 separating the individual North/South poles in the respective pole pairs 18. Each of the pole junctions 30 is divided into a high-resolution segment 34 corresponding with a high-resolution portion 38 of the magnetic track 14, and a reference segment 42a, 42b corresponding with a reference portion 46 of the magnetic track 14 (discussed in more detail below). Each of the pole junctions 30 in the magnetic track 14 is also jogged or stepped, such that the reference segment 42a, 42b of each of the pole junctions 30 is offset from the high-resolution segment 34 of the same pole junction 30. More particularly, the high-resolution segments 34 of adjacent pole junctions 30 are equally spaced from each other, while the reference segments 42a, 42b of adjacent pole junctions 30 may be unequally spaced, depending upon the direction of offset of the adjacent reference segments 42a, 42b.

With continued reference to FIG. 1, some of the pole junctions 30 include a reference segment 42a that is offset to the right of the high-resolution segment 34 of the same pole junction 30 (i.e., a right-offset reference segment 42a), while other pole junctions 30 include a reference segment 42b that is offset to the left of the high-resolution segment 34 of the same pole junction 30 (i.e., a left-offset reference segment 42b). The reference segments 42a, 42b may be arranged within the group 26 of adjacent magnetic pole pairs 18a-18d to provide a unique combination or sequence of states (e.g., either right-offset or left-offset) for each pole pair 18a-18d in the group 26. As a result, a particular pole pair 18a-18d may be identified by matching it with its associated unique combination of adjacent right-offset and left-offset reference segments 42a, 42b. Using this "two-state" logic (i.e., using only right-offset and left-offset reference segments 42a, 42b), the four adjacent pole pairs 18a-18d illustrated in FIG. 1 can be uniquely identified according to Table 1 below, in which "R" denotes a right-offset reference segment 42a and "L" denotes a left-offset reference segment 42b.

TABLE 1

| Pole Junctions | Pole Pairs | | | |
|---|---|---|---|---|
|  | 1 | 2 | 3 | 4 |
| North/South | L | L | R | R |
| South/North | L | R | L | R |

The North/South pole junction is the pole junction 30 between the North and South poles within a particular pole pair 18a-18d, while the South/North pole junction is the pole junction 30 between the South pole and the North pole of adjacent pole pairs 18a-18d. As described in more detail below, the magnetic encoder 10 of the present invention is operable to determine the absolute position of the magnetic track 14 locally within the group 26 of four magnetic pole pairs 18a-18d by recognizing the unique combination of adjacent right-offset and left-offset reference segments 42a, 42b separating the individual poles in the pole pairs 18a-18d.

The magnetic encoder 10 also includes a first or high-resolution magnetic sensor 50 proximate the high-resolution portion 38 of the track 14, and a second magnetic sensor 54 proximate the reference portion 46 of the track 14. Each of the sensors 50, 54 is configured as a Hall string multiplying sensor, and both sensors 50, 54 are disposed on a single substrate or microchip 58 (see also FIG. 2). Each of the sensors 50, 54 includes an array of individual (e.g., four or more) Hall sensing elements arranged in a line. Particularly, in one embodiment of the encoder 10, each of the sensors 50, 54 may include an array of sixteen individual Hall sensing elements arranged in a line. With reference to FIG. 1, both the reference sensor 54 and the high-resolution sensor 50 have a length sufficient to span adjacent pole junctions 30 in the magnetic track 14 and detect the presence of adjacent pole junctions 30 at any given time (i.e., at least one North/South pole junction 30 and at least one adjacent South/North pole junction 30). In other words, the length of each of the sensors 50, 54 is greater than the spacing between adjacent pole junctions. The amount of offset between the high-resolution segment 34 and the reference segment 42a or 42b in each pole junction 30 may be less than the spacing between adjacent individual Hall sensing elements in the reference sensor 54. Alternatively, the high-resolution sensor 50 may not span adjacent pole junctions 30 in the magnetic track 14. As a further alternative, the sensors 50, 54 may be disposed on separate microchips, or the individual sensor elements in each sensor array may be independently supported from each other as distinct Hall-effect sensors.

With reference to FIGS. 1 and 2, the magnetic encoder 10 also includes a logic module 62 in communication with the sensors 50, 54. The logic module 62 may be a hard-wired electronic circuit or a microprocessor operable to receive high-resolution and reference signals detected by the sensors 50, 54, respectively, analyze the signals, and calculate the local absolute position of the magnetic track 14 within the group 26 of four pole pairs 18a-18d. The logic module 62 may be positioned on the microchip 58 with the sensors 50, 54, or the logic module 62 may be positioned on another substrate besides the microchip 58. Although a physical (i.e., wired) connection is schematically illustrated in FIGS. 1 and 2, wireless communication may be employed to allow the sensors 50, 54 to communicate with the logic module 62. The logic module 62 is further operable to output the local absolute position of the magnetic track 14 within the group 26 of four pole pairs 18a-18d to another controller (e.g., a motor controller) in the system in which the encoder 10 is used.

As understood by those skilled in the art, the high-resolution sensor 50 can be configured with a particular resolution (i.e., "counts" or "edges" per pole pair) to yield a total number of counts or edges per revolution of the magnetic track 14. For example, the high-resolution sensor 50 may be configured having a resolution of 160 counts/pole pair, such that a total of 640 counts may be detected as the magnetic track 14 rotates through the group 26 of four pole pairs 18a-18d shown in FIG. 1. To arrive at the 640 count total, the high-resolution sensor 50 would count from 1 to 160 for the first pole pair 18a (with counts 1-80 occurring within the North pole and counts 81-160 occurring within the South pole of the first pole pair 18a), reset, and continue counting from 1 to 160 for the second pole pair 18b and so forth.

However, as previously mentioned, only a portion of the magnetic track 14 is shown in FIG. 1. A typical application of the encoder 10 might require at least 16 magnetic pole pairs on the magnetic track 14. In this situation, the group 26 of four pole pairs 18a-18d shown in FIG. 1 would be repeated four times around the circumferential length of the magnetic track 14 to yield the requisite 16 pole pairs. As such, the absolute position of the magnetic track 14 may be determined locally within a quarter-turn of the rotating target 22 to which the magnetic track 14 is attached using the unique combination of adjacent right-offset and left-offset reference segments 42a, 42b shown in FIG. 1 and described in Table 1.

During operation of the encoder 10 (i.e., when the rotating target 22 and magnetic track 14 are rotating relative to the sensors 50, 54 in a clockwise or left-to-right direction from the perspective of FIG. 1), the high-resolution sensor 50 is configured to detect the magnetic field emanated by the high-resolution portion 38 of the track 14, and the reference sensor 54 is configured to detect the magnetic field emanated by the reference portion 46 of the track 14. The analog output of each of the sensors 50, 54 is sinusoidal, having a positive value associated with the North pole in each pole pair 18a-18d and a negative value associated with the South pole in each pole pair 18a-18d. As a result of the unequal spacing of the reference segments 42a, 42b of the pole junctions 30, the sinusoidal output of the reference sensor 54 is out of phase with the sinusoidal output of the high-resolution sensor 50.

The sinusoidal output of each of the sensors 50, 54 is input to the logic module 62, which compares the sinusoidal output of each of the sensors 50, 54 and determines whether the phase of the sinusoidal output of the reference sensor 54 is leading the sinusoidal output of the high-resolution sensor or lagging the sinusoidal output of the high-resolution sensor 50.

More particularly, the logic module 62 may compare the sinusoidal output of the individual Hall elements of the reference sensor 54, respectively, with the sinusoidal output of the individual Hall elements of the high-resolution sensor 50. Alternatively, the logic module 62 may compare a rolling average of the output of a group (e.g., three or six) of adjacent Hall elements of the reference sensor 54, respectively, with the rolling average of the output of a group of adjacent Hall elements of the high-resolution sensor 50.

In other words, the logic module 62 is operable to determine whether the reference sensor 54 is disposed proximate a left-offset reference segment 42b (i.e., when the sinusoidal output of the reference sensor 54 is leading the sinusoidal output of the high-resolution sensor 50), or whether the reference sensor 54 is disposed proximate a right-offset reference segment 42a (i.e., when the sinusoidal output of the reference sensor 54 is lagging the sinusoidal output of the high-resolution sensor 50). Since the reference sensor 54 spans the distance between at least one North/South pole junction 30 and at least one South/North pole junction 30 on the magnetic track 14, the reference sensor 54 is operable to detect adjacent North/South and South/North pole junctions 30, and the logic module 62 is operable to correlate the particular combination of North/South and South/North pole junctions 30 detected by the reference sensor 54 with one of the magnetic pole pairs 18a-18d in the group 26 of four pole pairs 18a-18d shown in FIG. 1 to determine a relative position of the particular pole pair 18a-18d within the group 26. It should be understood that the encoder 10 is operable in this manner when the magnetic track 14 is rotating relative to the reference sensor 54 or stationary.

With continued reference to FIG. 1, the magnetic track 14 is shown rotated to a position in which the reference sensor 54 spans the North/South pole junction 30 of the third pole pair 18c and the South/North pole junction 30 between the third and fourth pole pairs 18c, 18d, respectively. In this instance, the logic module 62 would be able to determine the absolute position of the magnetic track 14 locally within the group 26 of four pole pairs 18a-18d by recognizing the right-offset reference segment 42a associated with the North/South pole junction 30 of the third pole pair 18c and the left-offset reference segment 42b associated with the South/North pole junction 30 between the third and fourth pole pairs 18c, 18d, respectively, by comparing the phase difference of the sinusoidal outputs of the reference sensor 54 and the high-resolution sensor 50 as described above. Then, the logic module 62 would reference a lookup table similar to Table 1 to find that only the third pole pair 18c includes the detected combination of right-offset and left-offset reference segments 42a, 42b, meaning that two pairs (i.e., pole pairs 18a and 18b) are to the left of the reference sensor 54 and the reference sensor 54 is proximate or aligned with the third pole pair 18c. The logic module 62 may then calculate the local absolute position within the group 26 using the recorded or captured count value of the high-resolution sensor 50 and the relative position of the third pole pair 18c within the group 26. Specifically, the logic module 62 would perform the following calculation to determine the local absolute position of the magnetic track 14 within the group 26 of four pole pairs 18a-18d: 2 pole pairs to the left of the reference sensor 54×160 counts/pole pair+the number of counts detected or captured by the high-resolution sensor 50. For example, at an instance when the captured count value of the high-resolution sensor 50 is 70, the calculated count value would be equal to 390 (i.e., 2×160+70), which correlates to the $390^{th}$ position of the 640 total count positions that can be detected by the sensor 50 within the local group 26 of four magnetic pole pairs 18a-18d.

Considering another example, with reference to FIG. 3, the magnetic track 14 is shown rotated to a position in which the reference sensor 54 spans the South/North pole junction 30 between the first pole pair 18a and the second pole pair 18b and the North/South pole junction 30 within the second pole pair 18b. In this instance, the logic module 62 would be able to determine the absolute position of the magnetic track 14 within the local group 26 of four pole pairs 18a-18d by recognizing the left-offset reference segment 42b associated with the South/North pole junction 30 between the first and second pole pairs 18a, 18b and the left-offset reference segment 42b associated with the North/South pole junction 30 within the second pole pair 18b by comparing the phase difference of the sinusoidal outputs of the reference sensor 54 and the high-resolution sensor 50 as described above. Then, the logic module 62 would reference a lookup table similar to Table 1 to find that the detected combination of right-offset and left-offset reference segments 42a, 42b places the reference sensor 54 somewhere between the first and second pole pairs 18a, 18b.

The logic module 62 would then look to the count value captured by the high-resolution sensor 50. If the captured count value is between 81 and 160, then the local absolute position is somewhere within the first pole pair 18a. However, if the captured count value is between 1 and 80, then the local absolute position is somewhere within the second pole pair 18b. For a count value of the high-resolution sensor 50 equal to 30, the logic module 62 would perform the following calculation to determine the absolute position within the local group 26 of four pole pairs 18a-18d: 1 pole pair to the left of the reference sensor 54×160 counts/pole pair+30=190, which correlates to the $190^{th}$ position of the 640 total counts that can be detected by the sensor 50 within the local group 26 of four magnetic pole pairs 18a-18d. For a count value of the high-resolution sensor 50 equal to 130, the logic module 62 would perform the following calculation to determine the absolute position within the local group 26 of four pole pairs 18a-18d: 0 pole pairs to the left of the reference sensor 54×160 counts/pole pair+130=130, which correlates to the $130^{th}$ position of the 640 total count positions that can be detected by the sensor 50 within the local group 26 of four magnetic pole pairs 18a-18d.

Figure 5:
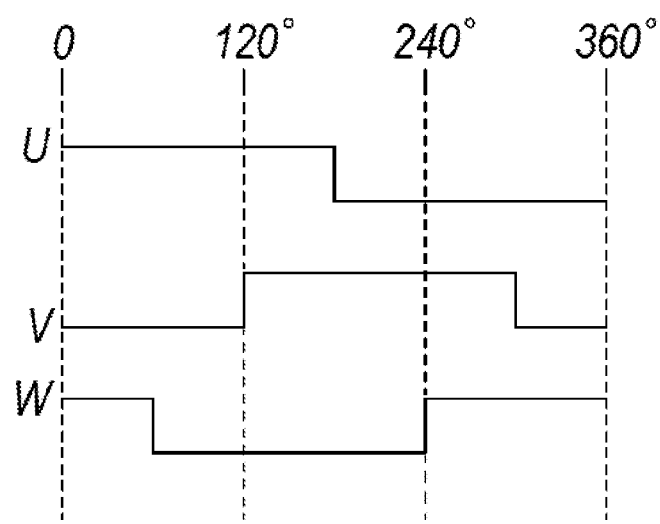
FIG. 5 is a graph illustrating U, V, W style commutation signals that may be output by the conventional sensor assembly of FIG. 4 or the magnetic encoder of FIG. 1.

With reference to FIG. 4, conventional magnetic encoders E typically include three separate Hall-effect sensors U, V, W, a dedicated magnetic track T1 having one or more North/South pole pairs (only a single North/South pole pair is shown in FIG. 4), and a high-resolution magnetic track T2 attached to a common rotating target (e.g., an armature of an electric motor). The sensors U, V, W are spaced about the rotational axis of the tracks T1, T2 at 120 degree intervals, and are switched "on" and "off" by detecting the pole junctions between the individual pole pairs of the track T1. As such, each sensor U, V, W is turned "on" for 180 degrees of rotation of the magnetic track T1, and each sensor U, V, W is turned "off" for 180 degrees of rotation of the magnetic track T1 (see FIG. 5). As a result, the position of the magnetic tracks T1, T2 may be determined using the unique combinations of "on" and "off" states of the sensors U, V, W over a single complete revolution of the magnetic tracks T1, T2 and the associated rotating target. For example, Table 2 below illustrates six different rotational positions of the magnetic track T1 and the associated rotating target based upon the unique combinations of "on" and "off" states exhibited by the sensors U, V, W:

TABLE 2

| Rotational Position No. | Rotational Position (degrees) | U, V, W Output (1 = "on"; 0 = "off") |
|---|---|---|
| 1 | 0-60 | 1, 0, 1 |
| 2 | 61-120 | 1, 0, 0 |
| 3 | 121-180 | 1, 1, 0 |
| 4 | 181-240 | 0, 1, 0 |
| 5 | 241-300 | 0, 1, 1 |
| 6 | 301-360 | 0, 0, 1 |

Using the U, V, W commutation signals output by the magnetic encoder E of FIG. 4, a controller interfacing with the magnetic encoder E may determine the rotational position of the tracks T1, T2 and the associated rotating target (i.e., within 60 degree increments). For example, the magnetic encoder E shown in FIG. 4 may be implemented with a motor controller for detecting the position of an armature of a brushless DC electric motor with respect to the field component of the motor at a frequency of four times per revolution of the armature. So, once per quarter-turn of the armature, the U, V, W output of the magnetic encoder E is analyzed by the motor controller to determine the relative position of the armature and the tracks T1, T2 with respect to the field component of the motor (i.e., the U, V, W output will correlate to one of Positions 1-6; see Table 2). The motor controller then uses this information to switch the current direction through the armature to cause the armature to rotate continuously with respect to the field component of the motor.

The encoder 10 of FIG. 1 may be used to create the same U, V, W commutation signals without the additional Hall-effect sensors U, V, W and the dedicated, single pole-pair magnetic track T1. Specifically, in an application of the encoder 10 requiring 16 pole pairs in the magnetic track 14, the group 26 of four pole pairs 18a-18d shown in FIG. 1 would be repeated four times around the circumferential length of the magnetic track 14 to yield the requisite 16 pole pairs, such that each group 26 coincides with a quarter-turn or 90 degrees of rotation of the magnetic track 14 and the rotating target 22. The logic module 62, therefore, is capable of creating a square wave similar to the "U" output of FIG. 5 having a value of "1" for two consecutive pole pair groups 26 and a value of "0" for the following two consecutive pole pair groups 26. The logic module 62 may then create a second square wave similar to the "V" output of FIG. 5 that is out of phase with the U output by 120 degrees, and a third square wave similar to the "W" output of FIG. 5 that is out of phase with the U output by 240 degrees. Using the brushless DC electric motor example above, the square waves created by the logic module 62 may be input to the motor controller which, in a similar manner as described above, would use this information to switch the current direction through the armature to cause the armature to rotate continuously with respect to the field component of the motor.

The encoder 10 may also be used to determine the absolute position of the magnetic track 14 and the attached rotating target 22 over a complete revolution if the single group 26 of pole pairs 18a-18d spans a complete revolution of the rotating target 22. In this situation, the calculated count position is not only indicative of the local absolute position within the group 26 of four pole pairs 18a-18d, but also is indicative of the absolute position of the magnetic track 14 over a complete revolution of the rotating target 22. The encoder 10 may also replace a resolver in some brushless DC/AC electric motor applications.

Figure 6:
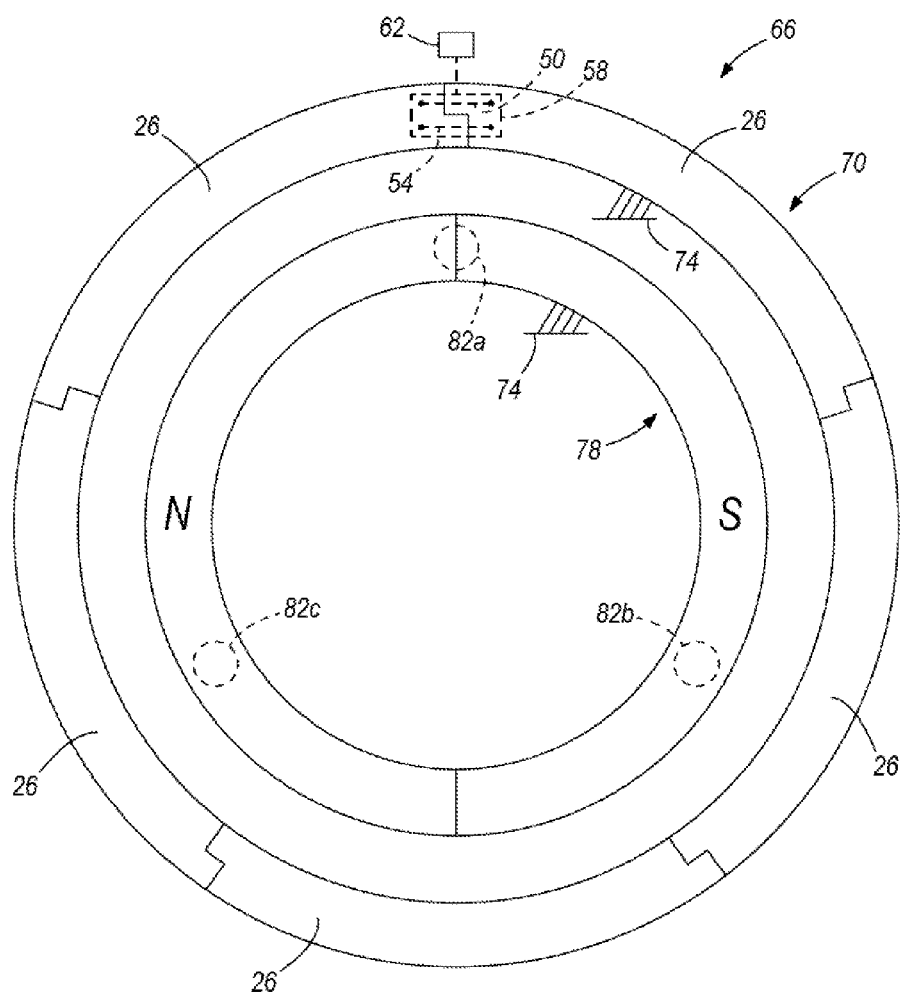
FIG. 6 is a schematic view of another embodiment of a sensor assembly of the present invention.

With reference to FIG. 6, another embodiment of a sensor assembly or magnetic encoder 66 is schematically illustrated, with like components having like reference numerals. The encoder 66 includes a magnetic track 70, attached to a rotating target 74, having five of the groups 26 of pole pairs 18a-18d shown in FIG. 1 positioned end to end and circularly arranged. The encoder 66 also includes a high-resolution sensor 50 and a reference sensor 54 on a single microchip 58, and a logic module 62 in communication with the sensors 50, 54. The encoder 66 further includes a dedicated, single pole-pair magnetic track 78 attached to the rotating target 74 and three Hall-effect sensors 82a-82c spaced about the rotational axis of the tracks 70, 78 at 120-degree intervals. Each of the sensors 82a-82c is switched "on" and "off" by detecting the pole junctions between the individual pole pairs of the track 70. As such, each sensor 82a-82c is turned "on" for 180 degrees of rotation of the magnetic track 70, and each sensor 82a-82c is turned "off" for 180 degrees of rotation of the magnetic track 70, thereby outputting signals similar to the commutation signals shown in FIG. 5. As such, the three Hall-effect sensors 82a-82c are capable of determining six different windows or rotational positions each including a portion of the magnetic track 70.

In operation of the encoder 66, the output of the separate Hall-effect sensors 82a-82c, the high-resolution sensor 50, and the reference sensor 54 may be utilized to determine the absolute position of the magnetic track 70 over a complete revolution of the rotating target 74 (i.e., the "full-on" absolute position). The magnetic track 70 includes a resolution or a total number of count positions equal to 3200 (i.e., 5 groups×4 pole pairs/group×160 counts/pole pair) as a result of stringing together the five pole pair groups 26. At a given instance, the logic module 62 records or captures a relative count position or count value on the high-resolution portion of the magnetic track 70 using the high-resolution sensor 50. Then, the captured count value is used to calculate the absolute position within one of the local pole pair groups 26 using the process described above. At the same time the count value using the high-resolution sensor 50 is captured, the logic module 62 captures the particular logic state of the Hall-effect sensors 82a-82c (i.e., the logic state corresponding with one of Positions 1-6 in Table 2). Then, the logic module 62 may correlate the captured position number or window with the particular pole pair group 26 that contains the captured count value by the high-resolution sensor 50 to determine a relative position of the particular pole pair group 26 within the magnetic track 70. Knowing which of the five groups 26 contains the captured count value by the high-resolution sensor 50, the logic module 62 may then calculate the absolute position number on the magnetic track 70 using the calculated local absolute position within the particular pole pair group 26 and the relative position of the particular group 26 within the magnetic track 70. For example, if the logic module 62 calculates the local absolute position of the track 70 is equal to 400 (of the 640 total count positions in each group 26), and the logic module 62 has correlated the detected position number (i.e., one of Positions 1-6) with the fourth group 26 of pole pairs, then the absolute position of the magnetic track 70 may be calculated as: 3 groups to the left of the reference sensor 54×640 counts/group+400 counts=2320, which is one of the 3200 total count positions on the magnetic track 70.

Figure 7:
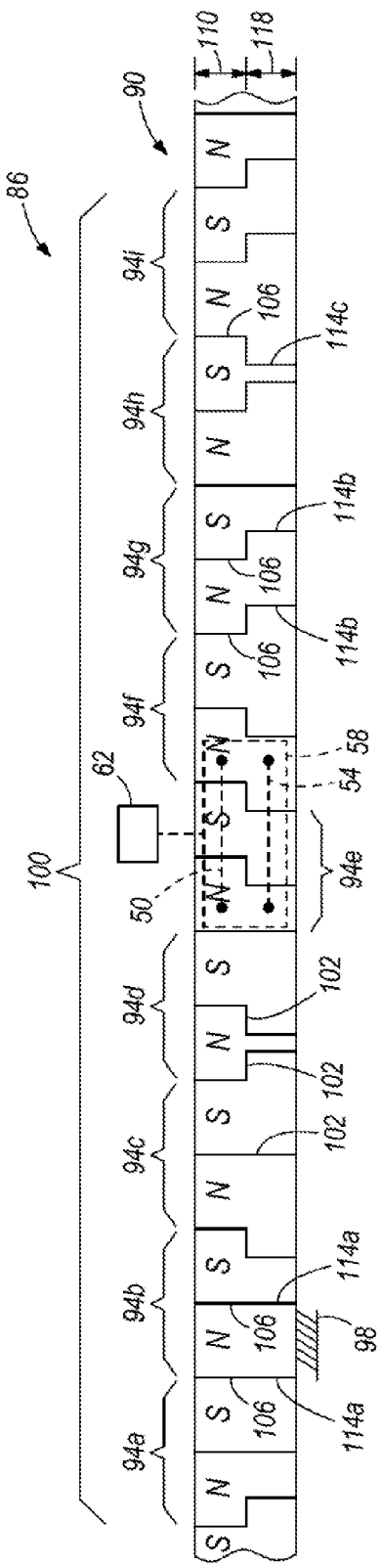
FIG. 7 is a schematic view of yet another embodiment of a sensor assembly of the present invention, illustrating a magnetic track and two magnetic sensors disposed proximate a first location on the magnetic track.

With reference to FIG. 7, yet another embodiment of a sensor assembly or a magnetic encoder 86 is schematically illustrated, with like components having like reference numerals. The encoder 86 includes a magnetic track 90 having a plurality of North/South pole pairs 94a-94i. Although the magnetic track 90 is schematically illustrated in a linear configuration for clarity, the encoder 86 is configured as a rotary encoder including a rotating target 98 upon which the magnetic track 90 is mounted. In such a configuration, the magnetic track 90 would be circular and concentric with the rotational axis of the rotating target 98. However, the encoder 86 of the present invention may alternatively be configured as a linear encoder, incorporating substantially similar structure and a method of operation as described herein with respect to the rotary encoder 86.

With continued reference to FIG. 7, only a portion of the magnetic track 90 is shown. Specifically, the illustrated portion of the magnetic track 90 includes a group 100 of nine pole pairs 94a-94i, each of which includes a pole junction 102 separating the individual North/South poles in the respective pole pairs 94a-94i. Each of the pole junctions 102 is divided into a high-resolution segment 106 corresponding with a high-resolution portion 110 of the magnetic track 90, and a reference segment 114a-114c corresponding with a reference portion 118 of the magnetic track 90. However, unlike the magnetic track 14 illustrated in FIG. 1, some of the pole junctions 102 in the magnetic track 90 are straight, such that the reference segment 114a in each of the straight pole junctions 102 is aligned with the high-resolution segment 106 of the same pole junction 102, while other pole junctions 102 in the magnetic track 90 are jogged or stepped, such that the reference segment 114b, 114c in each of the jogged pole junctions 102 is offset from the high-resolution segment 106 of the same pole junction 102. The high-resolution segments 106 of adjacent pole junctions 102 are equally spaced from each other, while the reference segments 114a-114c of adjacent pole junctions 102 may be unequally spaced, depending upon the direction of offset (or lack of offset) of the adjacent reference segments 114a-114c.

With reference to FIG. 7, some of the pole junctions 102 include a reference segment 114b that is offset to the right of the high-resolution segment 106 of the same pole junction 102 (i.e., a right-offset reference segment 114b), some pole junctions 102 include a reference segment 114c that is offset to the left of the high-resolution segment 106 of the same pole junction 102 (i.e., a left-offset reference segment 114c), while other pole junctions 102 are straight and include a reference segment 114a that is aligned with the high-resolution segment 106 of the same pole junction 102 (i.e., a zero-offset reference segment 114a). The reference segments 114a-114c may be arranged within the group 100 of adjacent magnetic pole pairs 94a-94i to provide a unique combination or sequence of states (e.g., either right-offset, left-offset, or zero-offset) for each pole pair 94a-94i in the group 100. As a result, a particular pole pair 94a-94i may be identified by matching it with its associated unique combination of adjacent reference segments 114a-114c. Using this "three-state" logic (i.e., using zero-offset, right-offset, and left-offset reference segments 114a-114c), the nine adjacent pole pairs 94a-94i illustrated in FIG. 7 can be uniquely identified according to Table 3 below, in which "0" denotes a zero-offset reference segment 114a, "R" denotes a right-offset reference segment 114b, and "L" denotes a left-offset reference segment 114c.

TABLE 3

| Pole Junctions | Pole Pairs | | | | | | | | |
|---|---|---|---|---|---|---|---|---|---|
| | 1 | 2 | 3 | 4 | 5 | 6 | 7 | 8 | 9 |
| North/South | 0 | 0 | 0 | L | L | L | R | R | R |
| South/North | 0 | L | R | 0 | L | R | 0 | L | R |

The North/South pole junction is the pole junction 102 between the North and South poles within a particular pole pair 94a-94i, while the South/North pole junction is the pole junction 102 between the South pole and the North pole of adjacent pole pairs 94a-94i. As described in more detail below, the magnetic encoder 86 is operable to determine the absolute position of the magnetic track 90 locally within the group 100 of nine magnetic pole pairs 94a-94i by recognizing the unique combination of adjacent zero-offset, right-offset, and left-offset reference segments 114a-114c separating the individual poles in the pole pairs 94a-94i.

With continued reference to FIG. 7, the magnetic encoder 86 also includes a first or high-resolution magnetic sensor 50 proximate the high-resolution portion 110 of the track 90, a second magnetic sensor 54 proximate the reference portion 118 of the track 90, and a logic module 62 in communication with the sensors 50, 54. As discussed in more detail below, the logic module 62 is operable to receive high-resolution and reference signals detected by the sensors 50, 54, respectively, analyze the signals, and calculate the local absolute position of the magnetic track 90 within the group 100 of nine pole pairs 94a-94i, and therefore the local absolute position of the rotating target 98, to another controller (e.g., a motor controller) in the system in which the encoder 86 is used.

As understood by those skilled in the art, the high-resolution sensor 50 can be configured with a particular resolution (i.e., "counts" or "edges" per pole pair) to yield a total number of counts or edges per revolution of the magnetic track 90. For example, the high-resolution sensor 50 may be configured having a resolution of 160 counts/pole pair, such that a total of 1440 counts may be detected as the magnetic track 90 rotates through the group 100 of nine pole pairs 94a-94i shown in FIG. 7. However, as previously mentioned, only a portion of the magnetic track 90 is shown in FIG. 7. A typical application of the encoder 86 might require more than nine pole pairs 94a-94i on the magnetic track 90. In this situation, the group 100 of nine pole pairs 94a-94i shown in FIG. 7 would be repeated two or more times around the circumferential length of the magnetic track 90 to yield the requisite number of pole pairs. As such, the absolute position of the magnetic track 90 may be determined locally within a fractional turn of the rotating target 98 to which the magnetic track 90 is attached (i.e., a half-turn, a one-third turn, a quarter-turn, etc.) using the unique combination of adjacent zero-offset, right-offset, and left-offset reference segments 114a-114c shown in FIG. 7 and described in Table 3.

During operation of the encoder 86, the generally sinusoidal output of each of the sensors 50, 54 is input to the logic module 62, which compares the sinusoidal output of each of the sensors 50, 54 and determines whether the phase of the sinusoidal output of the reference sensor 54 is leading the sinusoidal output of the high-resolution sensor 50, lagging the sinusoidal output of the high-resolution sensor 50, or in phase with the sinusoidal output of the high-resolution sensor 50. The logic module 62 may compare the sinusoidal output of the individual Hall elements of the reference sensor 54, respectively, with the sinusoidal output of the individual Hall elements of the high-resolution sensor 50. Alternatively, the logic module 62 may compare an analog or digital a rolling average of the output of a group (e.g., four) of Hall elements of the reference sensor 54, respectively, with the rolling average of the output of a group of Hall elements of the high-resolution sensor 50. The groups of Hall elements in each of the sensors 50, 54 may include consecutive or adjacent Hall elements in each of the sensors 50, 54. Alternatively, the groups of Hall elements in each of the sensors 50, 54 may include non-consecutive or non-adjacent Hall elements in each of the sensors 50, 54.

In other words, the logic module 62 is operable to determine whether the reference sensor 54 is disposed proximate a left-offset reference segment 114c (i.e., when the sinusoidal output of the reference sensor 54 is leading the sinusoidal output of the high-resolution sensor 50), whether the reference sensor 54 is disposed proximate a right-offset reference segment 114b (i.e., when the sinusoidal output of the reference sensor 54 is lagging the sinusoidal output of the high-resolution sensor 50), or whether the reference sensor 54 is disposed proximate a zero-offset reference segment 114a (i.e., when the sinusoidal output of the reference sensor 54 is in phase with the sinusoidal output of the high-resolution sensor 50). Since the reference sensor 54 spans the distance between at least one North/South pole junction 102 and at least one adjacent South/North pole junction 102 on the magnetic track 90, the logic module 62 is operable to correlate the particular combination of North/South and South/North pole junctions 102 detected by the reference sensor 54 with one of the magnetic pole pairs 94a-94i in the group 100 of nine pole pairs 94a-94i shown in FIG. 7. It should be understood that the encoder 86 is operable in this manner when the magnetic track 90 is rotating relative to the reference sensor 54 or stationary.

With continued reference to FIG. 7, the magnetic track 90 is shown rotated to a position in which the reference sensor 54 spans the North/South pole junction 102 of the fifth pole pair 94e and the South/North pole junction 102 between the fifth and sixth pole pairs 94e, 94f. In this instance, the logic module 62 would be able to determine the absolute position of the magnetic track 90 locally within the group 100 of nine pole pairs 94a-94i by recognizing the left-offset reference segment 114c associated with the North/South pole junction 102 of the fifth pole pair 94e and the left-offset reference segment 114c associated with the South/North pole junction 102 between the fifth and sixth pole pairs 94e, 94f by comparing the phase difference of the sinusoidal outputs of the reference sensor 54 and the high-resolution sensor 50 as described above. Then, the logic module 62 would reference a lookup table similar to Table 3 to find that only the fifth pole pair 94e includes the detected combination of left-offset and left-offset reference segments 114c, meaning that four complete pole pairs (i.e., pole pairs 94a-94d) are to the left of the reference sensor 54 and the reference sensor 54 is proximate or aligned with the fifth pole pair 94e. The logic module 62 would then perform the following calculation to determine the local absolute position of the magnetic track 90 within the group 100 of nine pole pairs 94a-94i: 4 pole pairs to the left of the reference sensor 54×160 counts/pole pair+the number of counts detected by the high-resolution sensor 50. For example, at an instance when the captured count value of the high-resolution sensor 50 is 70, the calculated count value would be equal to 710 (i.e., 4×160+70), which correlates to the 710$^{th}$ position of the 1440 total count positions that can be detected by the sensor 50 within the local group 100 of nine magnetic pole pairs 94a-94i.

Figure 8:
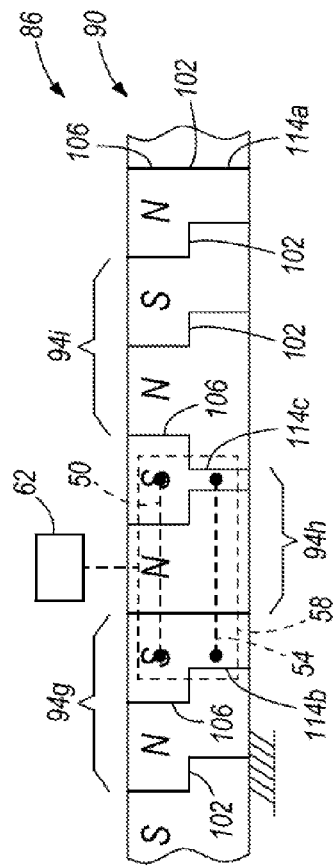
FIG. 8 is a schematic view of the magnetic sensors of FIG. 7 disposed proximate a second location on the magnetic track.

Considering another example, with reference to FIG. 8, the magnetic track 90 is shown rotated to a position in which the reference sensor 54 spans the South/North pole junction 102 between the seventh pole pair 94g and the eighth pole pair 94h and the North/South pole junction 102 within the eighth pole pair 94h. In this instance, the logic module 62 would be able to determine the absolute position of the magnetic track 90 within the local group 100 of nine pole pairs 94a-94i by recognizing the zero-offset reference segment 114a associated with the South/North pole junction 102 between the seventh and eighth pole pairs 94g, 94h and the right-offset reference segment 114b associated with the North/South pole junction 102 within the eighth pole pair 94h by comparing the phase difference of the sinusoidal outputs of the reference sensor 54 and the high-resolution sensor 50 as described above. Then, the logic module 62 would reference a lookup table similar to Table 3 to find that the detected combination of zero-offset and right-offset reference segments 114a, 114b places the reference sensor 54 somewhere between the seventh and eighth pole pairs 94g, 94h. The logic module 62 would then look to the count value captured by the high-resolution sensor 50. If the captured count value is between 81 and 160, then the local absolute position is somewhere within the seventh pole pair 94g. However, if the captured count value is between 1 and 80, then the local absolute position is somewhere within the eighth pole pair 94h. For a captured count value of the high-resolution sensor 50 equal to 30, the logic module 62 would perform the following calculation to determine the absolute position within the local group 100 of nine pole pairs 94a-94i: 7 pole pairs to the left of the reference sensor 54×160 counts/pole pair+30=1150, which correlates to the 1150$^{th}$ position of the 1440 total count positions that can be detected by the sensor 50 within the local group 100 of nine magnetic pole pairs 94a-94i. For a captured count value of the high-resolution sensor 50 equal to 130, the logic module 62 would perform the following calculation to determine the absolute position within the local group 100 of nine pole pairs 94a-94i: 6 pole pairs to the left of the reference sensor 54×160 counts/pole pair+130=1090, which correlates to the 1090$^{th}$ position of the 1440 total count positions that can be detected by the sensor 50 within the local group 100 of nine magnetic pole pairs 94a-94i.

The encoder 86 of FIG. 7 may be used to create U, V, W commutation signals in a similar manner as the encoder 10 of FIG. 1. The encoder 86 may also be used to determine the absolute position of the magnetic track 90 over a complete revolution of the rotating target 98 if the single group 100 of nine pole pairs 94a-94i spans a complete revolution of the rotating target 98. In this situation, the calculated count position is not only indicative of the local absolute position within the group 100 of nine pole pairs 94a-94i, but also is indicative of the absolute position of the magnetic track 90 over a complete revolution of the rotating target 98.

Alternatively, the encoder 86 may include a magnetic track (not shown), attached to a rotating target, having five of the groups 100 of pole pairs 94a-94i shown in FIG. 7 positioned end to end and circularly arranged. The encoder 86 may also include a dedicated, single pole-pair magnetic track attached to the rotating target and three Hall-effect sensors spaced about the rotational axis of the tracks at 120 degree intervals in a similar manner to the encoder 66 of FIG. 6. The output of the separate Hall-effect sensors, the high-resolution sensor 50, and the reference sensor 54 may be utilized to determine the absolute position of the magnetic track over a complete revolution of the rotating target in a similar manner as the encoder 66 of FIG. 6. The magnetic track would include a resolution or a total number of count positions equal to 7200 (i.e., 5 groups×9 pole pairs/group×160 counts/pole pair) as a result of stringing together the five pole pair groups 100.

Figure 9:
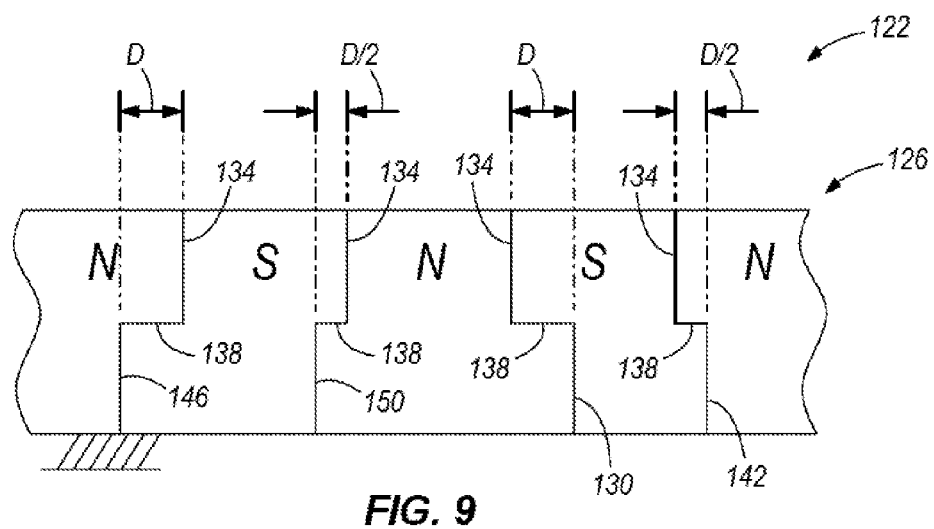
FIG. 9 is a schematic view of another embodiment of a sensor assembly of the present invention, illustrating pole junctions having different offset dimensions.

With reference to FIG. 9, another embodiment of a sensor assembly or magnetic encoder 122 of the present invention can be configured using "four-state" logic, thereby increasing the number of pole pairs in each group to sixteen, such that additional Hall-effect sensors (e.g., sensors 82a-82c in FIG. 6) and a separate single pole-pair magnetic track 78 (e.g., track in FIG. 6) are not required to determine the absolute position of a magnetic track having a total of sixteen pole pairs. FIG. 9 illustrates a portion of a magnetic track 126 of the encoder 122, including right-offset reference segments 130 that are spaced from a high-resolution segment 134 in the same pole junction 138 by a dimension D, and right-offset reference segments 142 that are spaced from the high-resolution segment 134 in the same pole junction 138 by a dimension D/2. In a similar manner, the track 126 includes left-offset reference segments 146 that are spaced from the high-resolution segment 134 in the same pole junction 138 by a dimension D, and left-offset reference segments 150 that are spaced from the high-resolution segment 134 in the same pole junction 138 by a dimension D/2. The logic module 62 may be configured, therefore, to recognize the difference between the reference segments 130, 142, 146, 150 having the D and D/2 spacing to increase the number of pole pairs in the local group from nine to 25. The encoder 122 could alternatively be configured using "five-state" logic by incorporating a straight pole junction in addition to the illustrated offset pole junctions shown in FIG. 9, thereby increasing the number of pole pairs in each group to twenty-five.

Various features of the invention are set forth in the following claims.

What is claimed is:

1. A method of determining a position on a magnetic track of an encoder, the method comprising:
   providing a group of magnetic pole pairs that forms a portion of the magnetic track;
   recording a relative position within a first magnetic pole pair in the group using a first magnetic sensor proximate a high-resolution portion of the magnetic track;
   detecting adjacent pole junctions within the group of magnetic pole pairs with a second magnetic sensor positioned proximate a reference portion of the magnetic track;
   correlating the adjacent pole junctions with the first magnetic pole pair to determine a relative position of the first magnetic pole pair within the group; and
   calculating a local absolute position within the group using the relative position within the first magnetic pole pair and the relative position of the first magnetic pole pair within the group.

2. The method of claim 1, wherein the group of magnetic pole pairs is a first group, and wherein the method further includes arranging a plurality of pole pair groups identical to the first group end to end with the first group.

3. The method of claim 2, wherein the magnetic track is a first magnetic track, and wherein the method further comprises:
   providing a second magnetic track including a single magnetic pole pair and two pole junctions;
   detecting the pole junctions using a plurality of Hall-effect sensors substantially equally spaced from each other and positioned proximate the second magnetic track; and
   creating a plurality of windows using the output of the Hall-effect sensors, wherein each window includes a portion of the magnetic track.

4. The method of claim 3, further comprising:
   correlating the first group of magnetic pole pairs with one of the windows to determine a relative position of the first group within the first magnetic track; and
   calculating an absolute position on the first magnetic track using the calculated local absolute position within the first group and the relative position of the first group within the first magnetic track.

5. The method of claim 2, wherein each pole pair group includes four magnetic pole pairs, and wherein consecutive pairs of adjacent pole junctions in the group are different from each other.

6. The method of claim 2, wherein each pole pair group includes nine magnetic pole pairs, and wherein consecutive pairs of adjacent pole junctions in the group are different from each other.

7. The method of claim 2, wherein each pole pair group includes at least four magnetic pole pairs, and wherein consecutive pairs of adjacent pole junctions in the group are different from each other.

8. The method of claim 1, wherein the first magnetic sensor and/or the second magnetic sensor is a Hall string multiplying sensor supported on a microchip.

9. The method of claim 8, wherein the first and second magnetic sensors are configured as Hall string multiplying sensors supported on the same microchip.

10. The method of claim 1, wherein each of the first and second magnetic sensors includes an array of at least 4 Hall sensing elements.

11. The method of claim 1, wherein each of the adjacent pole junctions includes a high-resolution segment corresponding with the high-resolution portion of the magnetic track and a reference segment corresponding with the reference portion of the magnetic track, and wherein the reference segment of each pole junction is offset or aligned with the corresponding high-resolution segment in each pole junction.

12. The method of claim 11, wherein the reference segment of one of the adjacent pole junctions is offset from the high-resolution segment of the same pole junction in a first direction.

13. The method of claim 12, wherein the reference segment of the other of the adjacent pole junctions is offset from the high-resolution segment of the same pole junction in the first direction.

14. The method of claim 12, wherein the reference segment of the other of the adjacent pole junctions is offset from the high-resolution segment of the same pole junction in a second direction opposite the first direction.

15. The method of claim 12, wherein the reference segment of the other of the adjacent pole junctions is aligned with the high-resolution segment of the same pole junction.

16. The method of claim 11, wherein the reference segment of one of the adjacent pole junctions is offset from the high-resolution segment of the same pole junction in a first direction by a first amount, and wherein the reference segment of the other of the adjacent pole junctions is offset from the high-resolution segment of the same pole junction in the first direction by a second amount different than the first amount.

17. The method of claim 11, wherein the plurality of magnetic poles and pole junctions define at least four magnetic pole pairs, and wherein the reference segment of each pole junction on the magnetic track is offset from the high-resolution segment of the same pole junction.

18. The method of claim 11, wherein the plurality of magnetic poles and pole junctions define at least nine magnetic pole pairs, wherein the reference segment of at least one pole junction on the magnetic track is offset from the high-resolution segment of the same pole junction in a first direction, wherein the reference segment of at least one pole junction on the magnetic track is offset from the high-resolution segment of the same pole junction in a second direction opposite the first direction, and wherein the reference segment of at least one pole junction on the magnetic track is aligned with the high-resolution segment of the same pole junction.

19. The method of claim 1, wherein the step of detecting adjacent pole junctions within the group of magnetic pole pairs with the second magnetic sensor occurs when the magnetic track is rotating relative to the second magnetic sensor.

20. The method of claim 1, wherein the step of detecting adjacent pole junctions within the group of magnetic pole pairs with the second magnetic sensor occurs when the magnetic track is stationary relative to the second magnetic sensor.

* * * * *